United States Patent [19]
Hwang

[11] Patent Number: 5,243,962
[45] Date of Patent: * Sep. 14, 1993

[54] COOKING OVEN FOR SLOW-COOKING OF FOOD PRODUCTS

[75] Inventor: Yong Y. Hwang, Huron, Ohio

[73] Assignee: Stein, Inc., Sandusky, Ohio

[*] Notice: The portion of the term of this patent subsequent to Jan. 7, 2009 has been disclaimed.

[21] Appl. No.: 817,695

[22] Filed: Jan. 7, 1992

Related U.S. Application Data

[63] Continuation-in-part of Ser. No. 470,986, Jan. 26, 1990, Pat. No. 5,078,120.

[51] Int. Cl.$^5$ ............................................. F24C 15/32
[52] U.S. Cl. ................................ 126/21 A; 126/21 R; 99/443 C; 99/355
[58] Field of Search ........................... 126/21 R, 21 A; 99/443 C, 447, 355, 246

[56] References Cited

U.S. PATENT DOCUMENTS

| | | | |
|---|---|---|---|
| 4,587,946 | 5/1986 | Doyon et al. | 126/21 A X |
| 4,591,333 | 5/1986 | Henke | 126/21 A X |
| 4,648,377 | 3/1987 | Van Camp | 126/2 A |
| 4,792,303 | 12/1988 | Stewart et al. | 126/21 A X |
| 4,823,766 | 4/1989 | Violi | 126/21 A X |
| 4,909,236 | 3/1990 | Del Fabbro | 126/21 A |
| 5,078,120 | 1/1992 | Hwang | 126/21 A |

*Primary Examiner*—Larry Jones
*Attorney, Agent, or Firm*—Oldham, Oldham, & Wilson Co.

[57] ABSTRACT

The invention relates to a cooking oven for mass production of food products and a method for cooking food products. The oven includes an enclosure housing which forms a cooking chamber, having an endless pervious conveyor therein upon which food products are transported through the cooking chamber. The conveyor is arranged to provide a helically extending path over which food products will travel to increase dwell time within the cooking chamber while taking less floor space. A heated gaseous cooking medium is introduced into the cooking chamber and is circulated through an annulus formed by the helically extending conveyor to achieve high heat transfer to the food products being cooked. The oven can utilize steam and/or heated air to achieve varied cooking characteristics as desired and allows substantial versatility in the cooking process.

9 Claims, 7 Drawing Sheets

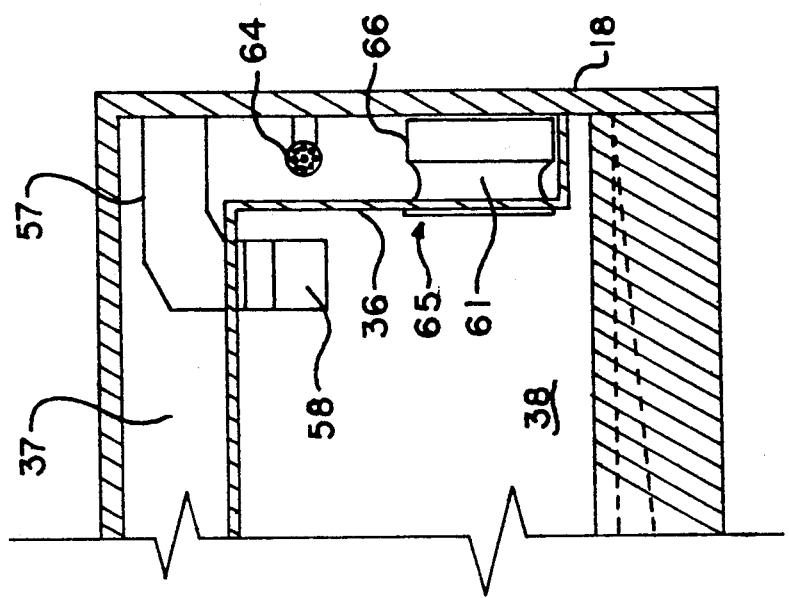
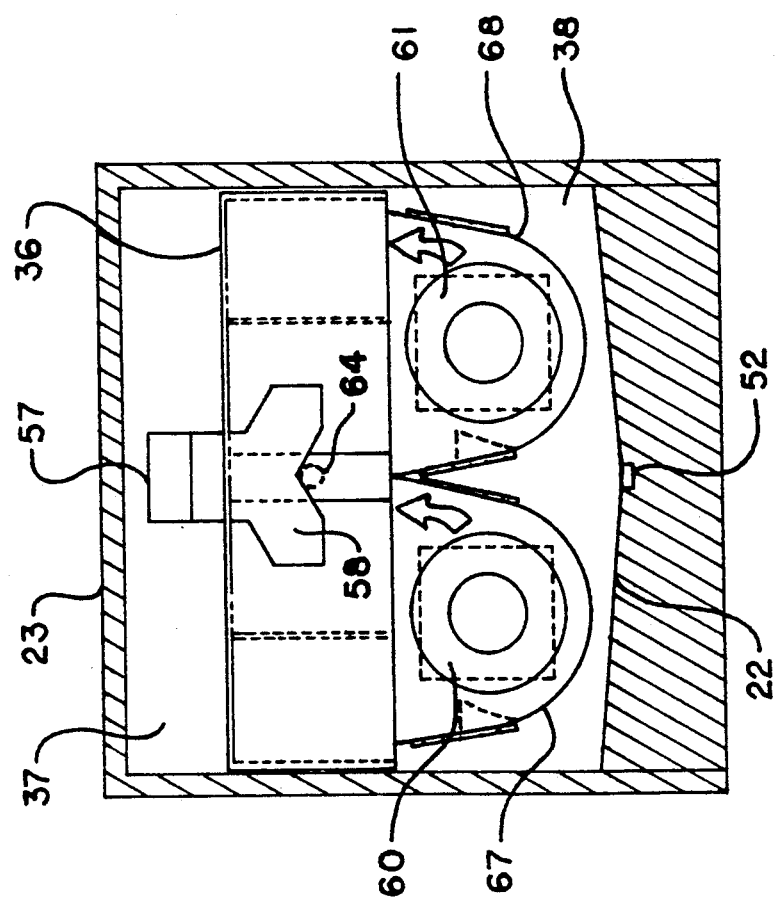

COOKING OVEN FOR SLOW-COOKING OF FOOD PRODUCTS

This is a continuation-in-part of U.S. patent application Ser. No. 470,986, filed Jan. 26, 1990, now U.S. Pat. No. 5,078,120.

BACKGROUND OF THE INVENTION

The invention relates to an oven structure and associated method of cooking especially designed for mass cooking of food products. More particularly, the invention is directed to an oven construction and cooking method for large production cooking wherein the food products are continuously transported in a spiral vertically ascending path through a cooking chamber to effect slow thorough cooking of the food products.

For mass cooking of food products such as in industrial cooking operations, various oven structures have been developed and are known to include a conveyor means which are formed in a spiral path for continuously conveying food product through a cooking chamber.

In such prior art cooking ovens, which are used for mass production of cooked food products and having a spiral conveyance path within a cooking chamber, there have been found to be associated problems with cooking efficiency, output of the oven, adaptability to a variety of food products, the inability to achieve various surface treatments of the food products, cleanability as well as other problems. The ability for food products to be cooked thoroughly while keeping dwell time in the cooking chamber of the oven to a minimum for adequate output from the oven is inhibited to some degree by the conveyor means utilized in these prior ovens. The conveyor systems have normally included a spiral supporting path on which an endless conveyor belt is supported and transported by suitable conveyor driving means. Steam heat utilized in the cooking chamber of the oven is merely introduced into the cooking chamber and is not effectively circulated within the cooking chamber.

Thus, in these prior oven systems, efficient and effective heat transfer in the cooking chamber is inhibited by non-circulation of the cooking medium and the consumption of energy to heat the conveyor belt's supporting structure may be significant. Additionally, although some cleaning systems have been provided in the prior art cooking ovens, a problem still exists in that the structure of these ovens require extensive and thorough cleaning of all interior surfaces of the cooking chamber including the conveyor belt supporting structure which may not be able to be achieved efficiently and quickly to maintain cost effective production of cooked food products. It is additionally found that the prior art systems have no means for obtaining surface treatment of the food products as they pass through the cooking chamber of the oven and have resorted to separate equipment to provide surface treatments such as browning, crisping, or other desirable features.

SUMMARY OF THE INVENTION

Based on the foregoing, there has been found a need to provide a cooking oven especially for use in production cooking environments wherein mass amounts of food product are desired to be cooked thoroughly in an efficient and cost effective manner. The benefits of providing a spiral conveyance path to increase the dwell time of the food products within the cooking chamber while making efficient use of space limitations are desired attributes achieved by the present invention. The present invention provides a oven structure and associated cooking method for cooking mass quantities of food products such as chicken or poultry parts, hamburger patties, fish patties, vegetable foods and other food products which may be cooked in a predominantly steam atmosphere.

The cooking oven of the invention comprises a cooking chamber having top and bottom walls, side walls and end walls defining a substantially closed vapor leak proof enclosure having an inlet and an outlet formed in at least one of the side or end walls thereof. A conveyor structure is disposed within the cooking chamber so as to convey food products through the cooking chamber from the inlet and exiting through the outlet wherein the food products are conveyed in a spiral path on a plurality of superimposed helically extending tiers within the cooking chamber. A source of heat or heating means may extend through one of the side or end walls, or may be provided within the cooking chamber, for heating a gaseous cooking medium in the cooking chamber which is then circulated by one or more fans disposed within the cooking chamber. The source of heat may be a source of steam and flash or heated air, wherein the heated air may be provided by a direct fired gas burner, and air to air heat exchanger, a remote heat exchanger, thermal fluid or electric heating means as some examples.

In particular, the gaseous cooking medium is made to circulate through the conveyor belt and around the food products positioned on the belt in a continuous manner for efficient heat transfer from the heated gaseous cooking medium to the food products. To accomplish this end, the conveyor belt and supporting structure allows the heated gaseous cooking medium to flow in an essentially vertical path through the conveyor belt in a continuous manner. In order to provide continuous circulation of the cooking medium, it should be recognized that no structure associated with the conveyor belt or supporting means should inhibit effective circulation through the helically extending tiers of the conveyor belt. This will allow efficient heat transfer between the heated gaseous cooking medium and food products to enable more efficient use of the oven and to allow surface treating of the food products in the cooking chamber if desired. Other characteristics of the oven structure allow for ease of adjustment of the cooking environment within the cooking chamber and means for treatment of food products passing through the cooking chamber as well as for cleaning the interior surfaces of the cooking chamber thoroughly, conveniently and in a cost effective manner.

It is therefore a main object of the invention to provide a cooking oven for mass cooking of food products which will thoroughly cook a variety of food products quickly and conveniently in an efficient manner.

It is another object of the invention to provide an oven of the aforementioned type wherein the heated gaseous cooking medium utilized in the cooking chamber thereof is generated from at least one heat source which may comprise a source of steam heat or a source of dry heated air either alone or in conjunction with one another. In this way, the gaseous cooking medium and cooking environment may be adjusted as to temperature and moisture content so that various cooking characteristics can be achieved within the cooking chamber of the oven.

A still further object of the invention is to provide an oven of the aforementioned type wherein the oven can be effectively and rapidly cleaned and wherein drippings from the food products are continuously urged or drained outwardly of the oven.

Another object of the invention is to provide an oven of the aforementioned type wherein a gaseous cooking medium disposed within the cooking chamber is distributed for uniformity of heat as it is circulated within the cooking chamber by means of a positive pressure differential created therein.

Still another object of the invention is to provide a cooking oven of the aforementioned type which has a sanitary design, is easily cleaned, and includes means for effectively treating food products passing through the cooking chamber to meet the requirements and regulations associated therewith.

Yet another object of the invention is to provide an oven of the aforementioned type which includes safety features to make use of the oven both simple and nonhazardous to the operator.

BRIEF DESCRIPTION OF THE DRAWINGS

These and other objects and advantages of the invention will become apparent from a further reading of the detailed description of the invention in conjunction with the accompanying drawings, wherein:

FIG. 6 is a partially broken, generally diagrammatic enlarged sectional view taken in general along the plane of line 6—6 of FIG. 2, and illustrating the suction fan means which circulates the cooking medium from a heater means to the conveyor means which holds food products thereon, and then is operable to recirculate the gaseous cooking medium for recycling within the cooking chamber;

FIG. 7 is a partially broken, generally diagrammatic enlarged sectional view of a side elevation showing the portions of the cooking chamber as shown in FIG. 6;

DETAILED DESCRIPTION OF THE INVENTION

Figure 1:
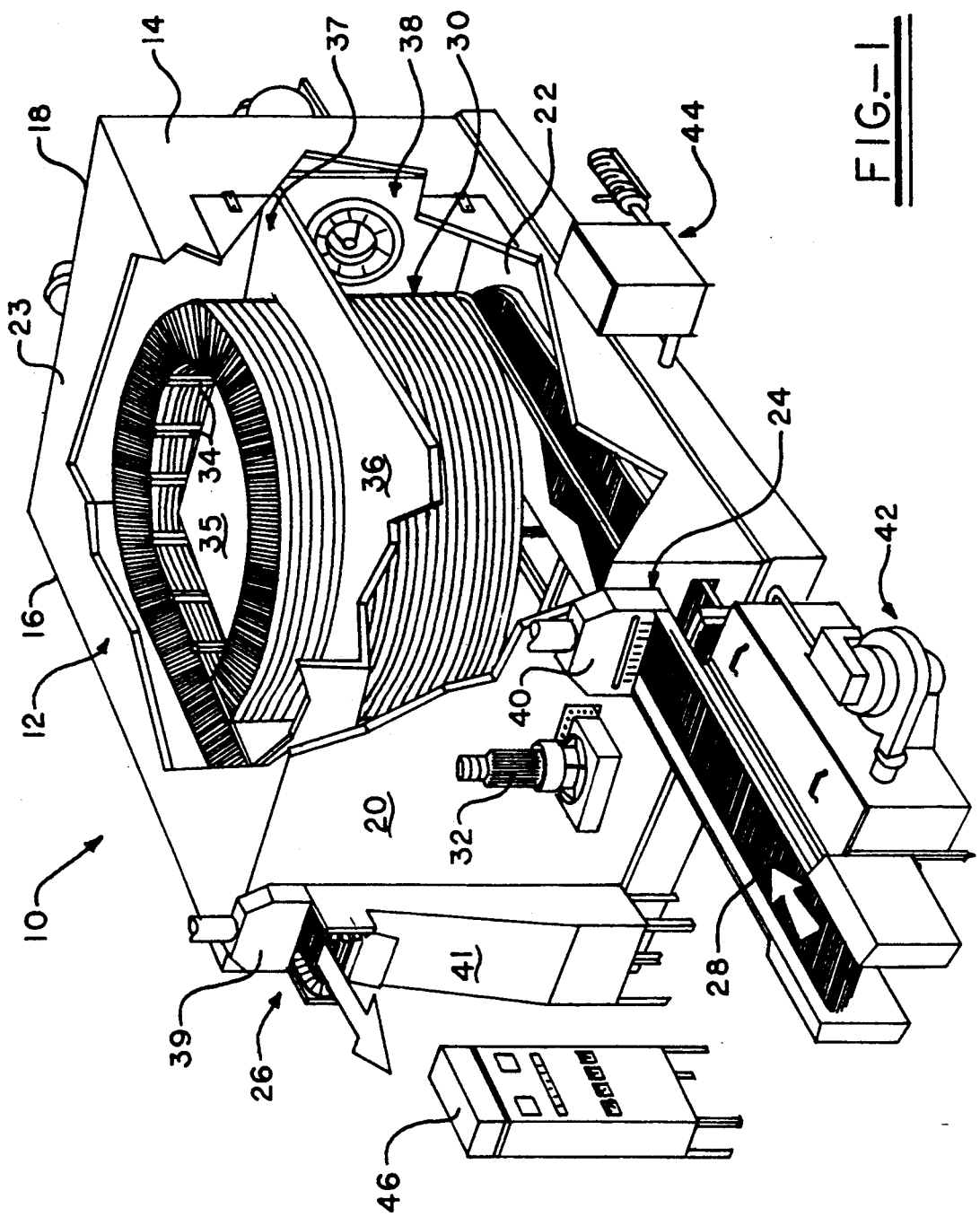
FIG. 1 is a perspective view of the cooking oven of the invention in partial cutaway view showing the conveyor system and cooking chamber thereof.

Referring now to the drawings, FIGS. 1-4 show generally the cooking oven 10 which comprises a cooking chamber 12 having a front wall 14 back wall 16, side walls 18 and 20, a floor 22 and a top wall 23 which define a substantially closed enclosure having an inlet 24 and an outlet 26 formed in at least one of the front, back or side walls 14, 16, 18 and 20 respectively through which food products are introduced into and removed from the cooking chamber 12. The openings 24 and 26 are preferably made as small as feasible to retard the egress of a heated gaseous cooking medium from the cooking chamber 12. The walls of the enclosure are preferably double walls having an interior insulation 13 in the space therebetween. In the preferred embodiment, both the inlet 24 and outlet 26 are formed in the side wall 20 wherein the inlet 24 enters the cooking chamber 12 at a lower region thereof and the outlet 26 exits the cooking chamber 12 at an upper portion thereof. It should be recognized that either the inlet or outlet could be positioned to enter or exit the cooking chamber 12 at a different location as a matter of convenience for a particular application.

An endless conveyor belt 28 is directed into the cooking chamber through the inlet 24 and is designed to carry a large volume of food products which are desired to be cooked in the oven 10. The conveyor belt 28 is adapted to follow, at least through part of its length, a path comprising a number of superimposed, helically extending tiers forming a belt pile as shown at 30. The endless conveyor belt 28 is designed to fully support food products thereon but is formed to allow a heated gaseous cooking medium to flow readily therethrough without being inhibited by the conveyor belt. A suitable conveyor belt which allows both straight and curved paths to be followed, may be as described in U.S. Pat. No. 3,938,651, incorporated herein by reference. In general, the conveyor belt 28 may comprise a number of mutually articulated and interadjustable link means forming the two sides of the belt, including a bottom supporting portion interposed between the links wherein the bottom supporting portions may be clothed with a wire or other surface-forming material to provide a supporting plane for the belt. The link means are designed as spacers which are arranged to support or be supported by an immediately overlying or underlying tier of the conveyor belt. In this way, the conveyor system is self-supporting and no separate belt support is needed between the tiers of the spiral conveying system. Thus, the entire space making up the spiral conveyance path of the system is open to flow of a heated gaseous cooking medium therethrough.

The conveyor belt 28 and the belt pile 30 although possibly similar to that described in U.S. Pat. No. 3,938,651, must be modified to be useful in the cooking oven the present invention. In the cooking oven, a cooking environment is generated within the cooking chamber 12 comprising a hot and moist environment which by-products of food products cooking in the oven such as grease and other drippings from the food products. This will require the conveyor means to withstand the cooking environment and allow easy and effective cleaning of the cooking chamber to maintain cleanliness requirements. The conveyor belt means at 28 is therefore preferably constructed of a stainless steel so as to withstand the high temperatures generated within the cooking chamber 12.

Figure 9:
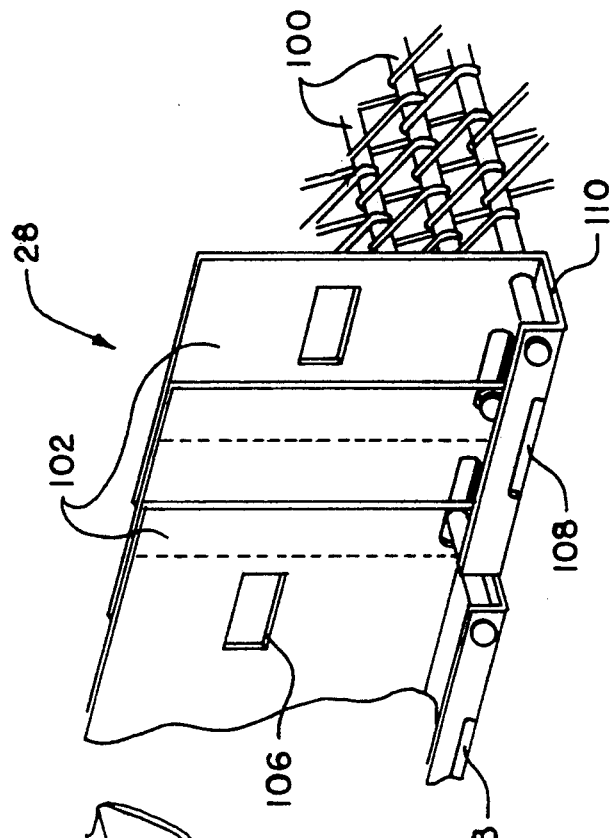
FIG. 9 shows a partially broken perspective view of the conveyor belt used in the oven to transport food products within the cooking chamber.

Turning to FIG. 9, a preferred embodiment of the conveyor belt 28 is shown in part, wherein the mutually articulated and interadjustable link means include a bottom part 100 coupling opposed links 102 (only one side shown) which form the two sides of the belt 28. The bottom part 100 comprises transverse connecting elements for the links 102 and is clothed with wire netting 104 or similar surface-forming material. The spacers 102 act to support the super- imposed, helically extending tiers of the belt pile 30 and substantially enclose the space between the links 102 on which the food products to be cooked within the cooking oven will be placed on the surface formed by the wire netting 104. The links 102 of the superimposed belt tiers will thus form a circular, vertical channel through which a heated gaseous cooking medium will flow predominantly.

Although the flow of the heated gaseous cooking medium is desired to be predominantly vertically through the annulus formed by the superimposed belt tiers, small apertures 106 may be disposed in the sides of the links 102 to allow the heated gaseous cooking medium to flow outward from the annulus or in the transverse direction to the vertical annulus. Allowing a small amount of transverse flow of the heated gaseous cooking medium has been found to provide some equalization of temperatures both across the conveyor belt and down through the vertical annulus formed thereby. The incorporation of holes 106 into the sides of the links 102 causes some disturbance in the flow within the annulus formed by the conveyor belt and may provide better heat transfer characteristics over all surfaces of food products on the conveyor belt. Additionally, it should be recognized that the outer surface of the belt pile 30 has greater surface area relative to the inner surface. Therefore, whenever there exists a temperature variation between the belt pile 30 and the cooking chamber 12 surrounding the belt pile, there will normally be more heat transfer across the outer wall due to its larger surface area. The provision of apertures 106 acts to equalize temperatures across the belt width and compensate for temperature variations which may exist across the wall through enhancement of cross flow heat transfer component. The overall effect is to obtain uniform cooking over the width of the belt. Although it should be evident that a cooling effect of the heated gaseous cooking medium will be caused by the cooler temperatures of the food products in lower regions of the oven or where food products enter the oven on the belt, some higher temperature cooking medium may escape through apertures 106 so as to equalize to some degree the temperatures within cooking chamber 12 surrounding the belt pile 30. Thus, a small amount of transverse flow of the heated gaseous cooking medium may be desirable to achieve these various advantages.

Additionally, the links 102 may be provided with apertures 108 formed in a U-shaped channel 110 which adds support to the link means 102 and facilitates driving of the conveyor belt 28. The apertures 108 allow any accumulated drippings or other residue from the food products to be drained effectively from the belt pile to facilitate subsequent cleaning operations. It should be recognized that the belt pile 30 as seen in FIGS. 1-4 may comprise any suitable number of tiers of the conveyor belt 28 to achieve the desired dwell time within the cooking chamber 12 of the oven 10. Variations of the conveyor belt 28 are contemplated in the present invention as the only essential element of the conveyor belt system is that flow of heated gaseous cooking medium vertically through the superimposed, helically extending tiers of the conveyor belt is necessary. For example, certain aspects of Swedish Patent Application 8206760-4 or PCT application SE86/00582 which show improved conveyor means could be utilized in the present invention.

Figure 3:
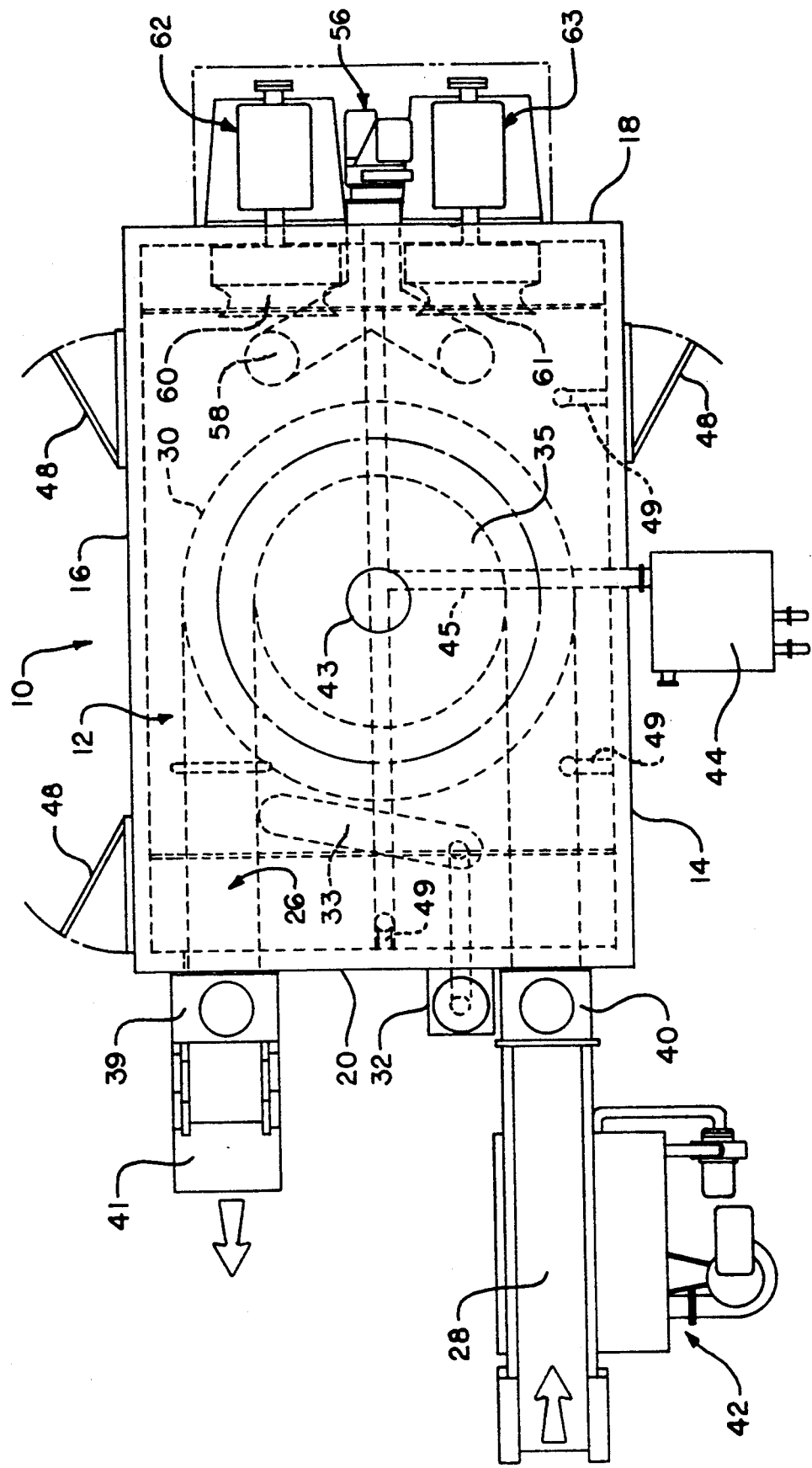
FIG. 3 is a somewhat diagrammatic top plan view of the cooking oven.

The conveyor belt system of the present invention must also be modified from that which was known in the prior art in order to be compatible with use in the cooking oven of the invention. As seen in FIGS. 1 and 3, motor 32 is utilized to drive a supporting means for the belt pile 30 in a circular path for continuous movement of the endless conveyor belt 28. The motor 32 must be mounted on the outside of the cooking chamber 12 so as not to be effected by the extreme environmental conditions inside the cooking chamber 12. The drive means itself, generally indicated at 33 in FIG. 3, can be what may be termed as a wagon-train which supports the belt pile 30 and is chain driven by the motor 32 in a circular path for continuous movement of the endless conveyor belt 28. This basic drive construction is set forth in U.S. Pat. No. 3,938,651, or may alternatively comprise an improved system as seen in U.S. Pat. No. 4,565,282 which are incorporated herein by reference. In addition to modifying these load bearing and transportation structures to include all stainless steel or some other high temperature material, the load bearing structure has been rigidified for positive transport of the belt pile 30. Additionally, a friction wheel associated with the drive means now includes elongated steel strips 34 as seen in FIG. 1, which are coupled to a deflecting plate 35 to support the plate 35 at the desired location relative to the belt pile 30. The deflecting plate 35 is cone shaped and will direct the heated gaseous cooking medium into and through the belt pile 30 to facilitate proper circulation of the cooking medium within the cooking chamber 12. The strips 34 are coupled with the drive mechanism of the conveyor system to travel with the belt pile 30 as it is rotated within the cooking chamber 12. The strips 34 also act to maintain the individual tiers of the belt pile 30 in coincident relationship for proper functioning of the conveyor system and proper circulation of the cooking medium.

The cooking chamber 12 is separated into a high pressure region 37 and low pressure region 38 by means of a mezzanine floor 36 disposed within the cooking chamber 12 and the deflecting plate 35. The inlet 24 to the cooking chamber 12 may be disposed in the low pressure region 38 while the outlet portion 26 is disposed at the high pressure region 37 of the cooking chamber. In this situation, a pressure differential may exist at the inlet verses outlet of the cooking chamber which may cause problems relative to heat retention characteristics of the cooking oven. In order to control the egress of heated medium from or the migration of air into the cooking chamber 12, exhaust stacks 39 and 40 may coact with the oven inlet and outlet openings 24 and 26 to regulate the egress or ingress of air so as to reduce heat loss and equalize pressure at these locations for safety purposes. The exhaust stacks 39 and 40 may also be used to exchange a portion of the heated gaseous cooking medium for a fresh supply of air to maintain the desired cooking characteristics while avoiding the use of a cooking medium which may introduce unwanted flavors or the like into the cooked food products. Preferably, there is also an exhaust vent 43 coupled to the high pressure region 37 of the cooking chamber 12. The exhaust vent 43 may include an automatically adjustable baffle means controlled by a servo-motor to regulate the pressure within chamber 12. The exhaust vent 43 may also be utilized to remove a portion of the cooking medium for exchanging with fresh cooking medium periodically.

It should be recognized that the endless conveyor belt 28, arranged to follow a path consisting of a number of superimposed, helically extending tiers, provides an extremely long path over which the food products to be cooked will travel. This allows the dwell time of the food products within the cooking chamber to be increased dramatically while not increasing the size of the oven housing to any great extent. It should also be recognized that the length of the conveyor belt 28 introduces a large amount of material into the oven which itself is heated as it travels through the cooking chamber. It is therefore desired to maintain the temperature of the conveyor belt 28 as high as possible to minimize the energy utilized to heat the belt thereby increasing the efficiency of the oven. In this respect, a belt take up system is used wherein the endless conveyor belt 28 exits the cooking chamber at 26 whereupon it travels a short distance outside the cooking chamber and then reenters the cooking chamber so as to maintain its temperature as high as possible. It is seen that at the exit 26 from the cooking chamber, a box 40 shields the conveyor belt 28 from the outside atmosphere to help to reduce heat loss in the oven. The box 40 may be insulated to facilitate this function although this is not a necessity. The belt 28 then reenters the cooking chamber at a lower portion thereof in the low pressure area 38 and is made to travel through the bottom of the cooking chamber 12 to return to the inlet 24. On its return path to the inlet 24, the belt 28 is subjected to a belt cleaning system generally indicated at 42 which will clean both sides of the belt and may comprise a recirculating sprayer system. The belt 28 is thoroughly cleaned before it is again loaded with food products to be cooked in the cooking oven 10.

It should also be evident that the interior of the cooking chamber 12 will be required to be cleaned so as to maintain sanitary conditions required for such food processing. The cleaning system 44 may comprise an in-place cleaning system having a plurality of spray nozzles or balls 49 disposed within the cooking chamber 12 at various locations and coupled to a supply pipe 45 (as seen in FIG. 3) which is coupled to a source cleaning fluid under pressure at 44. The spray balls 49 are preferably rotating balls which act to circulate a cleaning fluid supplied thereto more efficiently and also to impart more force to the cleaning fluid as it is dispersed from the spray balls 49. Previously, cooking ovens having cleaning systems associated therewith have utilized fixed balls and lower pressures while the cleaning system 44 of the present invention utilizes rotating balls and higher pressures. The cleaning fluid will thus be more effectively driven into the soil or grease found on the surfaces of the cooking chamber for more effective cleaning. The system may further include a recirculating supply of cleaning fluid which will be disposed in a reservoir 47 formed at the bottom portion of the cooking chamber 12 during a cleaning cycle. Access doors 48 to the interior of the cooking chamber 12 are especially designed with extended lips 50 at the bottom thereof to allow retention of a cleaning fluid supply in reservoir 47 of the cooking chamber 12. The bottom floor 22 of the cooking chamber 12 is seen to be sloping towards the middle of chamber 12 where a drainage channel 52 is positioned to continuously drain either drippings from the food products or a cleaning fluid continuously from the oven 10. The cleaning system 44 may be coupled to the drainage channel 52 to provide for recirculation of a cleaning fluid. A straining system (not shown) enables the recirculated cleaning fluid to remain free of debris which may act to clog the spray nozzles or balls 49. Thus, the cleaning system for the oven 10 allow for the efficient cleaning of the oven without rendering the oven inoperative for an extended period of time. Access doors 48 also enable easy maintenance and convenient introduction of additional cleaning equipment for more thorough cleaning of the ovens interior if desired.

It may also be desirable to form the bottom floor 22 with a water jacket 54 so as to provide water cooling for the floor. The water jacket 54 may be provided with a supply of cool water and a thermostat to monitor the temperature of the water in jacket 54 continuously. Upon reaching a predetermined temperature, the water in jacket 54 may be circulated with cooler water to maintain the temperature of floor 22 below a predetermined temperature In this way, flaming of drippings from food products within the oven is avoided.

Figure 2:
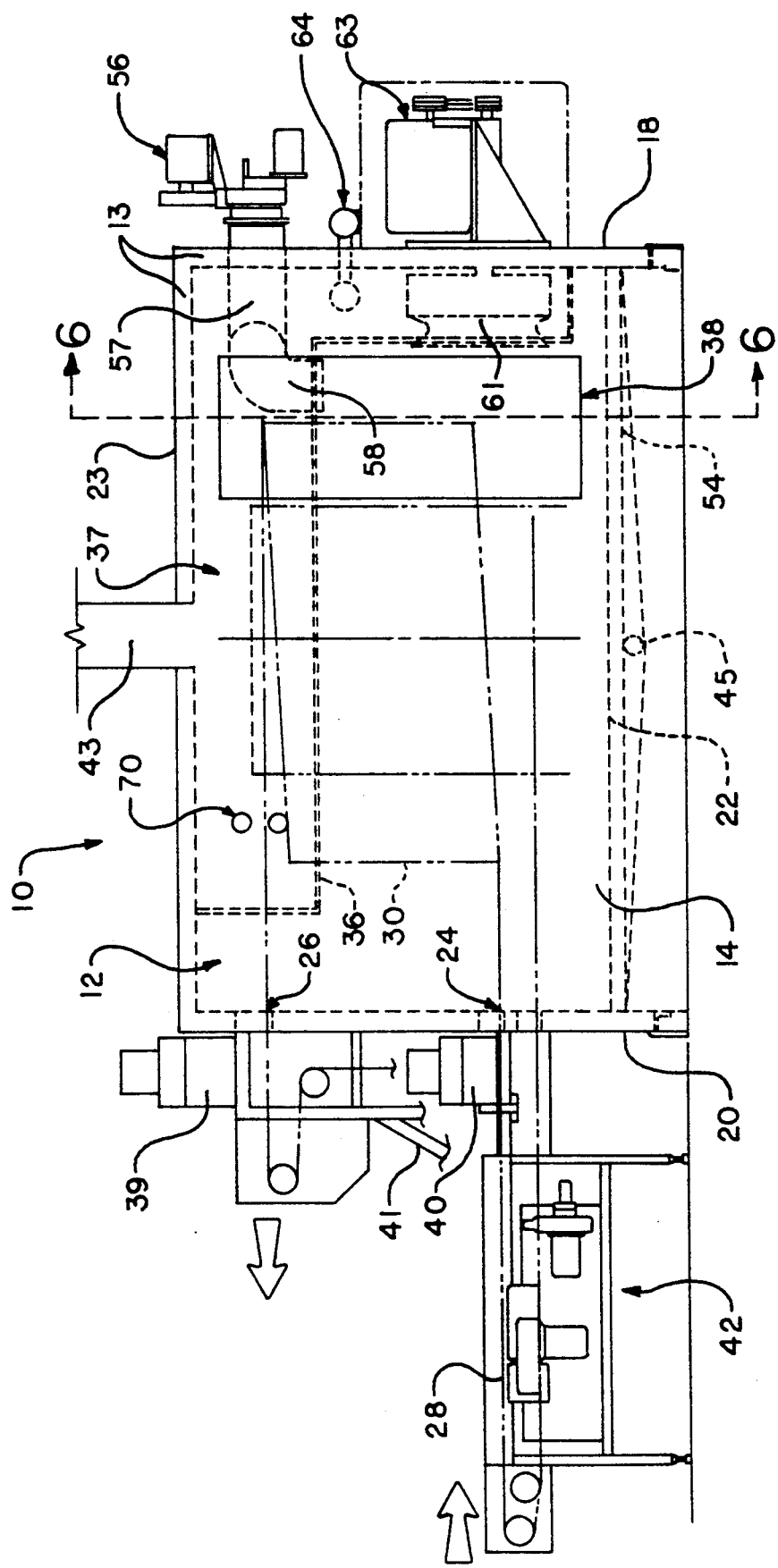
FIG. 2 shows a side elevational view of the cooking oven of the invention.
Figure 4:
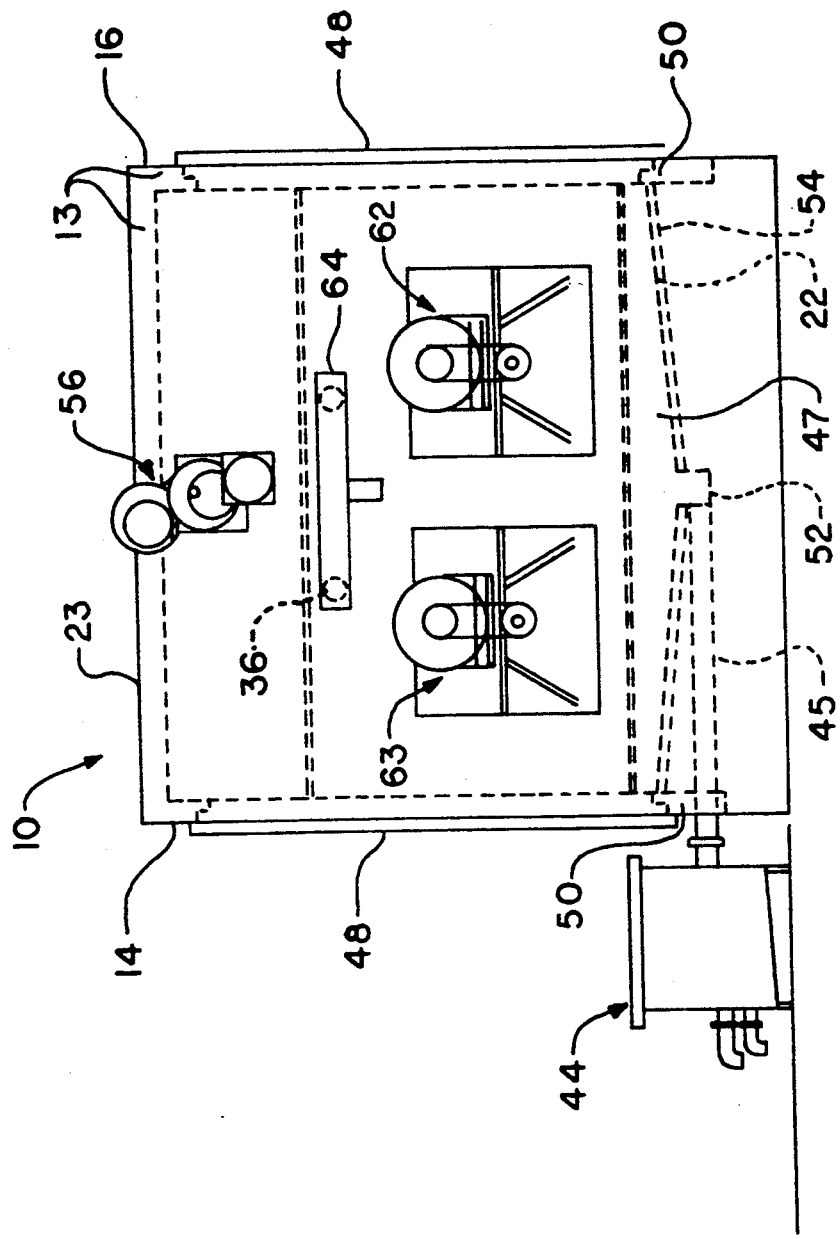
FIG. 4 is a right end elevational view of the cooking oven.

In the preferred embodiments of the invention a desired cooking environment is created within the cooking chamber 12 by means of at least one source of heat being a source of steam or heated air either alone or in combination. As seen in FIGS. 2–4, a heater means 56 may be provided to generate a high temperature gaseous cooking medium in the cooking chamber 12. In the preferred embodiment, the heater means 56 may be a direct fired gas burner, although it is recognized that various alternative heat sources could be effectively utilized. For example, an air to air heat exchanger or remote heat exchanger could be utilized, or as another alternative, either thermal fluid or electric heaters may be provided to introduce heat into the cooking chamber 12. In the preferred embodiment utilizing a gas fired burner, the burner may be coupled to a flame tube 57 (seen more distinctly in FIGS. 6 and 7) which extends through side wall 18 of the oven enclosure and may itself be coupled to a diverter tube 58 so as to supply an amount of a heated gaseous cooking medium into the low pressure region 38 of the cooking chamber 12. In the preferred embodiment, the diverter tube 58 acts to dispose a supply of heated gaseous cooking medium at a location adjacent one or more recirculating suction fans 60 and 61 operatively coupled to drive motors 62 and 63 respectively as seen in the Figures. With the use of an air to air or remote heat exchanger, the heated air produced thereby would also be directed into cooking chamber 12 in a similar manner. Alternatively, thermal fluid or electric heating means, diagrammatically indicated at 55 in FIG. 2, may be provided in cooking chamber 12 adjacent the recirculating suction fans 60 and 61. Such thermal fluid or electric heating means are known in the art, and may comprise one or more units adapted to generate the desired temperature within cooking chamber 12.

The suction fans 60 and 61 act to circulate a gaseous cooking medium from the low pressure region 38 to the high pressure region 37 separated by the mezzanine floor 36. As seen in FIG. 6, suction fans 60 and 61 are housed in the cooking chamber 12 such that the suction side 65 of each fan is disposed in the low pressure region 38 while the high pressure side 66 of each is in the high pressure region 37 being separated by the mezzanine floor 36. In this way, heated gaseous cooking medium disposed in the low pressure region 38 will be circulated into high pressure region 37 at high velocity. The fan means 60 and 61 may also include flow diverter structures 67 and 68 which will facilitate proper circulation of the heated gaseous cooking medium within cooking chamber 12. It should be recognized that the desired velocities at which the cooking medium is made to circulate can be varied by modifying the speed of fans 60 and 61.

In the alternative or in combination therewith, a source of steam 64 may be supplied under pressure to the interior of the cooking chamber 12. In the preferred embodiment the source of steam 64 is disposed relative to the suction fans 60 and 61 in the high pressure region 37 so as to not to be effected by the high temperature air supplied by heating means 56 if used in combination therewith. The provision of various sources of a heated gaseous cooking medium allows a great amount of versatility in the operation of the oven 10. In one embodiment, a source of steam heat is used exclusively, and slow thorough cooking of food products may be accomplished more efficiently than previously achievable. In a steam only embodiment, food products are made to travel through the cooking chamber for slow cooking thereof at about 160° F. to 200° F. in a high humidity or steam environment. In this way, the food products may be thoroughly cooked while retaining their moisture content during cooking. Alternatively, the heating means 56 being a burner, heat exchanger, electric or thermal fluid heater or the like, may be utilized to achieve higher temperatures within the cooking chamber 12, as for example between 200° F. and 450° F. When used in combination, the heating means 56 and source of steam 64 provide a higher temperature cooking environment in conjunction with a high humidity or steam environment.

Thus, the versatility of the oven 10 should be evident in achieving slow thorough cooking of food products using steam or faster, higher temperature cooking using high temperature air from a heat source such as burner alone or in conjunction with a source of humidity or steam to achieve varying cooking characteristics. The ability to raise the temperature within the cooking chamber 12 allows not only thorough cooking of the food products to be achieved but also may enable various surface characteristics to also be achieved. The high temperature heated gaseous cooking medium is made to circulate within the cooking chamber 12 and through the annulus created by the conveyor belt 28 around the food products situated thereon at a relatively high velocity which depending on the temperature of the gaseous cooking medium may achieve browning or other desired surface effects. It should also be realized that although two suction fans 60 and 61 have been shown in the drawings, one or additional fans may be utilized depending on the particular use and characteristics desired by the user. The operation of the oven including temperature control, steam control, pressure regulation, fan speed conveyor belt speed as well as all other functions of the oven are controlled at control box (as seen in FIG. 1) for ease and adjustment of variables associated with cooking of food products so as to make the oven easy to operate and effective for cooking of a large variety of food products.

Figure 5:
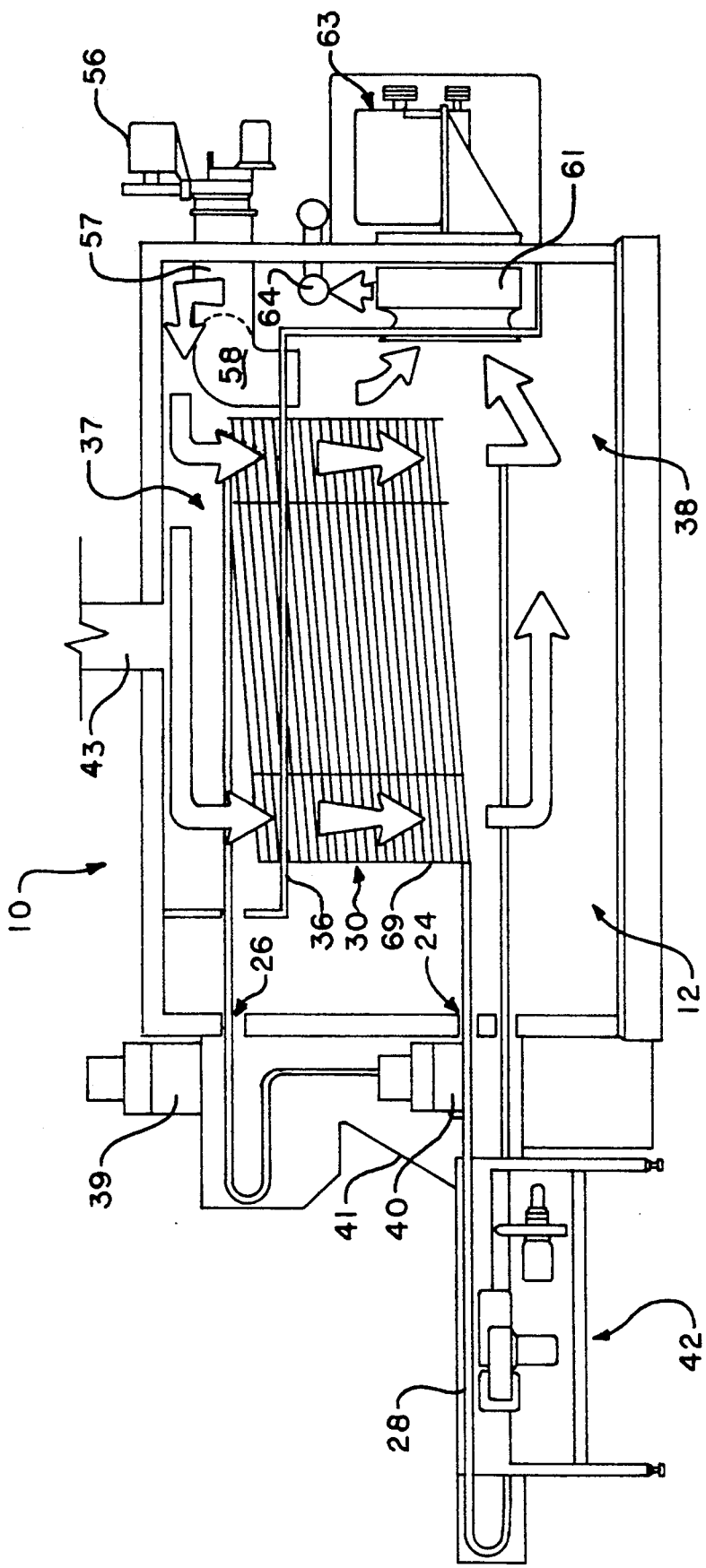
FIG. 5 is a generally diagrammatic side elevational view taken in section through the cooking chamber of the cooking oven and showing generally the circulation of a cooking medium within the cooking chamber and through the conveyor means therein.

Turning now to FIG. 5, the operation of the oven 10 with respect to a preferred embodiment will be described in more detail. The cooking environment within the cooking chamber 12 is achieved by means of the heater 56 which may comprise a gas fired burner coupled to a flame tube 57 disposed within the cooking chamber 12 and coupled to a flow diverter 58 so as to distribute a heated gaseous cooking medium into the low pressure region 38 in the vicinity of one or more suction fans 60 and 61. As mentioned previously, the heating means may alternatively be an air to air or remote heat exchanger, thermal fluid heater or an electric heater as desired. The suction fans 60 and 61 may be driven by means of an associated electric motor 62 and 63, respectively, for operation at the desired speed. The fans 60 and 61 act to suction the cooking medium from the low pressure region 38 and to redistribute the cooking medium at high velocity into the high pressure region 37 of the cooking chamber 12. As mentioned hereinbefore, a source of steam heat 64 may be provided in the path of the high velocity cooking medium generated at the location of the suction fans 60 and 61 in the high pressure region 37.

The source of high pressure cooking medium generated at the location of the fans 60 and 61 is directed through the high pressure region 37 towards the conveyor belt pile 30 which will be carrying food products thereon. The diverter plate 35 disposed at the center of the conveyor belt pile 30 diverts the high velocity, high pressure cooking medium to the vertical annulus 69 formed by the superimposed, helically extending tiers formed by the conveyor belt 28. The mezzanine floor 36 separates the high pressure region 37 from the low pressure region 38 and in conjunction with diverter plate 35 functions to direct flow the heated gaseous cooking medium through the pervious annulus region 69 which forms the only substantial escape from the high pressure region 37. It should be recognized that the hottest temperatures will be found in a high pressure region 37 and depending upon the products being cooked and the cooking characteristics which are desired, a number of the superimposed, helically extending tiers of the conveyor belt pile 30 may be positioned above the mezzanine floor 36 to be exposed to the higher temperature region for a longer period of time. As the heated gaseous cooking medium flows down through the annulus region 69 of the belt pile 30, the only substantial impediment to its flow will be the food products which are placed on the conveyor belt 28. The cooking medium is thereby made to flow around the food product at relatively high velocity if desired, to enhance the heat transfer between the cooking medium and the food products and enable varying cooking characteristics to be achieved.

Also as described in association with FIG. 9, the conveyor belt may be provided with apertures 106 therein to permit slight transverse flow of the cooking medium as indicated by the small arrows in FIG. 5 to help distribute the cooking medium and equalize temperatures both across the conveyor belt 28 and through the belt pile 30. The flow of the cooking medium from the annulus region 69 of the belt pile 30 will be into the reservoir formed at the bottom region of the cooking chamber 12 where the load bearing and drive mechanisms for the belt pile 30 will be located. The suction fans 60 and 61 will then act to draw the gaseous cooking medium from the low pressure region 38 after which it will be recirculated into high pressure region 37 at high velocity along with newly heated gaseous cooking medium from burner 56 or steam from source 64 so as to reheat the cooking medium.

Another feature of the oven system 10 of the present invention resides in a means 70 for removing excess drippings from the surface of the food products. The means 70 as seen in FIG. 2 may be positioned near the exit 26 from cooking chamber 12 in the high pressure region 37 disposed along the path of travel of the conveyor belt 28. The means 70 is positioned in this location to subject the food products on the conveyor belt 28 to a surface treatment operation after they have passed substantially through the cooking chamber during the cooking operation. It should be recognized that the structure of the oven including a conveyor belt 28 which is pervious to a cooking medium and is formed in a plurality of superimposed, helically extending tiers allows drippings from the food products to readily flow down through the belt stack 30 during the cooking operation. In this way, it is possible that food products positioned at a lower region of the belt stack 30 being conveyed upwardly through the cooking chamber 12 may themselves be subjected to some drippings from food products positioned above in the belt pile 30. The means 70 which may be termed an "air knife" enables any effect from such a process to be minimized.

Figure 8:
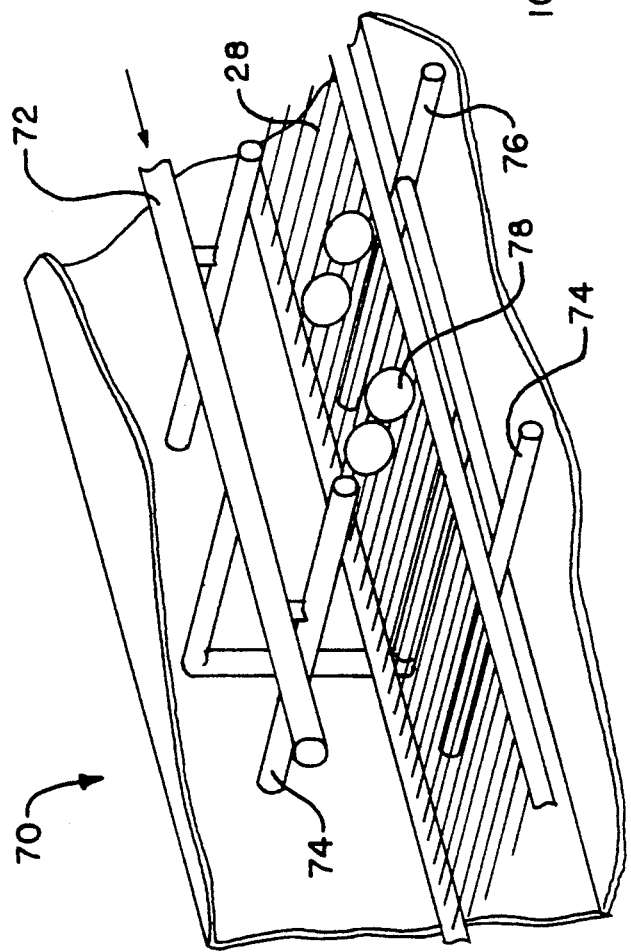
FIG. 8 is a partially broken, generally diagrammatic prospective view taken in the region of the food product located near the exit of the cooking chamber along the conveyor means.

With reference to FIG. 8, the means 70 or "air knife" is shown in more detail to include a supply conduit 72 which is coupled to a source of air under pressure or to a source of another fluid under pressure. For example, the means 70 could be coupled to the source of steam 64 or to an alternate source of fluid under pressure as desired. The supply conduit feeds a fluid at high pressure to a plurality of units 74 positioned above and below the conveyor belt 28 which may comprise a length of conduit extending transversely across the conveyor belt 28 and being substantially coextensive therewith. The units 74 may include a series of jet nozzles 76 extending along their length and directed toward the belt 28 which form the only outlet from the units 74 through which the fluid will be propelled at high velocity towards food products 78 traveling on the conveyor belt 28. The jet nozzles 76 may be designed to direct a sharp stream of fluid at food products traveling along belt 28 or may provide a disbursed flow of fluid as desired. In any event, the jet nozzles 76 should produce a flow of fluid across the entire width both above and below belt 28 to ensure that all food products passing through the region are treated by the "air knife" 70. It should be evident that the "air knife" can provide variable surface treatment of food products depending upon the pressure of supplied fluid and the physical characteristics of the jet streams created by jet nozzles 76 thereof.

In the operation of an oven in accordance with the invention, it is again mentioned that the operating characteristics can be varied widely due to the use of a source of heated gaseous cooking medium such as steam either alone or in combination with another source of heated air such as a burner. Additionally, the oven may utilize one or more suction fans to recirculate the heated gaseous cooking medium within the cooking chamber at various pressures and velocities as desired for a particular application. Merely as an example, the following parameters were found to provide excellent cooking characteristics for food products such as chicken parts cooked with the oven at high production rates. An oven having thirteen superimposed, helically extending tears of the belt pile 30 was provided in the cooking chamber 12. A cooking environment having a temperature of approximately 400° F., a steam flow of about 600 pph and a fan speed of approximately 1645 rpm, was found to thoroughly cook the food products with good results at a production rate of about 1730 lbs. of food product per hour. The dwell time in the oven for the food products was approximately 31 minutes with the conveyor belt load density of about 2.5 lbs. per square foot which is approximately 60% of the surface area. Alternatively, at a temperature of 250° F., a steam flow of about 600 pph and a fan speed of approximately 1645 rpm, a production rate of approximately 1250 lbs. per hour through the oven was achieved. The operating characteristics of the oven yielded good food product with a light golden brown surface with most fat rendered from the product.

Alternatively, an oven temperature of 250° F. with no steam flow produced good product with a light golden, crisp surface texture showing the varying surface characteristics which may be achieved. It should be recognized that many variables effect the yield achievable from the oven such as for example, the particular food products being cooked, the moisture and fat content, the processing methods, age, preparation treatment such as additives or spices, and a multitude of others. The oven was also found to provide very good heat transfer characteristics, and again show the adaptability of the oven construction to various cooking procedures and particular requirements.

It has also been found that good cooking characteristics can be achieved with a belt coverage of up to 80% of the total surface area of the conveyor belt. In this respect, it is only necessary to achieve proper circulation of the heated gaseous cooking medium within the cooking chamber and belt loading may vary accordingly. In a two fan system as is shown in the figures, velocities of the heated gaseous cooking medium in the high pressure region can exceed 1,000 fpm but may be varied according to the particular cooking characteristics desired. For example, in the steam only embodiment, the circulation of the heated gaseous cooking medium is not as essential to provide higher heat transfer characteristics, and only one suction fan may be necessary for such an application. The construction of the oven allows significant dwell time within the cooking chamber for food products traveling therethrough on the plurality of superimposed, helically extending tiers of the conveyor system. Depending on the number of tiers of the conveyor belt, the linear footage of travel for food products can be varied to optimize production rates for a particular application. Although the length of travel for food products within the cooking chamber is long, the oven is compact and provides slow, thorough cooking while enabling surface treatments, such as browning to be achieved. The oven construction provides an efficient cooking method and allows adaptability for various particular requirements as desired. Although preferred embodiments of the present invention have been described herein, various modifications or changes are contemplated within the scope of the invention. The invention is therefore not restricted to that described above and shown in the drawings but may be modified within the scope of the appended claims.

What is claimed is:

1. A cooking oven for the heating of food products comprising,
    a cooking chamber defined by an enclosure having at least one inlet and at least one outlet formed therein, said cooking chamber being divided into high pressure and low pressure regions,
    a pervious conveyor arranged in said cooking chamber providing a substantially helically extending path on which said food products will travel in said cooking chamber from said inlet to said outlet, means to provide a heated gaseous cooking medium within said cooking chamber, fan means for circulating said heated gaseous cooking medium from said high pressure region to said low pressure region in said cooking chamber, wherein said conveyor is constructed such that said gaseous cooking medium can circulate through said conveyor and around said food products positioned on the conveyor in a continuous manner for efficient heat transfer from said heated gaseous cooking medium to said food products.

2. An oven in accordance with claim 1, wherein,
said means to provide said heated gaseous cooking medium into said cooking chamber comprises at least heater means for heating a gaseous cooking medium within said cooking chamber.

3. An oven in accordance with claim 2, wherein,
said heater means comprises a gas fired burner which is adapted to direct heated air into said cooking chamber.

4. An oven in accordance with claim 2, wherein,
said heater means comprises an air to air heat exchanger which is adapted to direct heated air into said cooking chamber.

5. An oven in accordance with claim 2, wherein,
said heater means comprises a remote heat exchanger which is adapted to direct heated air into said cooking chamber.

6. An oven in accordance with claim 2, wherein,
said heater means comprises a thermal fluid heating means disposed within said cooking chamber adapted to heat the gaseous cooking medium within said cooking chamber.

7. An oven in accordance with claim 2, wherein,
said heater means comprises an electric heating means disposed within said cooking chamber adapted to heat the gaseous cooking medium within said cooking chamber.

8. A cooking oven in accordance with claim 1, wherein,
said conveyor is a self-supporting pervious belt which may be formed in superimposed tiers forming a pervious annulus.

9. A cooking oven in accordance with claim 8, wherein,
said sides of said annulus formed by the superimposed tiers of said conveying means include small apertures therein which allow an amount of heated gaseous cooking medium to flow transversely to said annulus to equalize temperatures across said conveying means and within said annulus.

* * * * *